United States Patent [19]
Giroux

[11] 4,203,227
[45] May 20, 1980

[54] TELESCOPIC STRAIGHT EDGE

[76] Inventor: Hector Giroux, Box 8131, Calgary, Alberta, Canada, T2J2V3

[21] Appl. No.: 907,881

[22] Filed: May 19, 1978

[51] Int. Cl.² .......................... G01B 3/06; G01B 3/08
[52] U.S. Cl. ...................................... 33/458; 33/161; 33/DIG. 1
[58] Field of Search .................. 33/95, 97, 103, 105, 33/106, 118, 119, 161, DIG. 1, 120, 458, 472, 496, 497, 500

[56] References Cited

U.S. PATENT DOCUMENTS

| | | | |
|---|---|---|---|
| 1,120,443 | 12/1914 | Buck | 33/105 |
| 1,391,621 | 9/1921 | Fenwirth | 33/161 |
| 2,642,667 | 6/1953 | Smiley | 33/161 |
| 2,669,026 | 2/1954 | Doerr | 33/105 |
| 3,792,511 | 2/1974 | Evans | 33/105 |

FOREIGN PATENT DOCUMENTS

| | | | |
|---|---|---|---|
| 29297 | 7/1907 | Austria | 33/105 |
| 572833 | 6/1924 | France | 33/161 |
| 670737 | 12/1929 | France | 33/161 |
| 10711 | 3/1900 | United Kingdom | 33/119 |

*Primary Examiner*—Richard R. Stearns
*Attorney, Agent, or Firm*—Howard I. Podell

[57] ABSTRACT

A straight edge for use in construction formed of a plurality of members joined by hinges to an end member fitted with a slidable section mounted by a dovetail groove and tongue. The butt sections of each member are fitted with a magnet at each hinge joint so as to latch the unfolded members together in the extended position.

1 Claim, 5 Drawing Figures

U.S. Patent
May 20, 1980
4,203,227
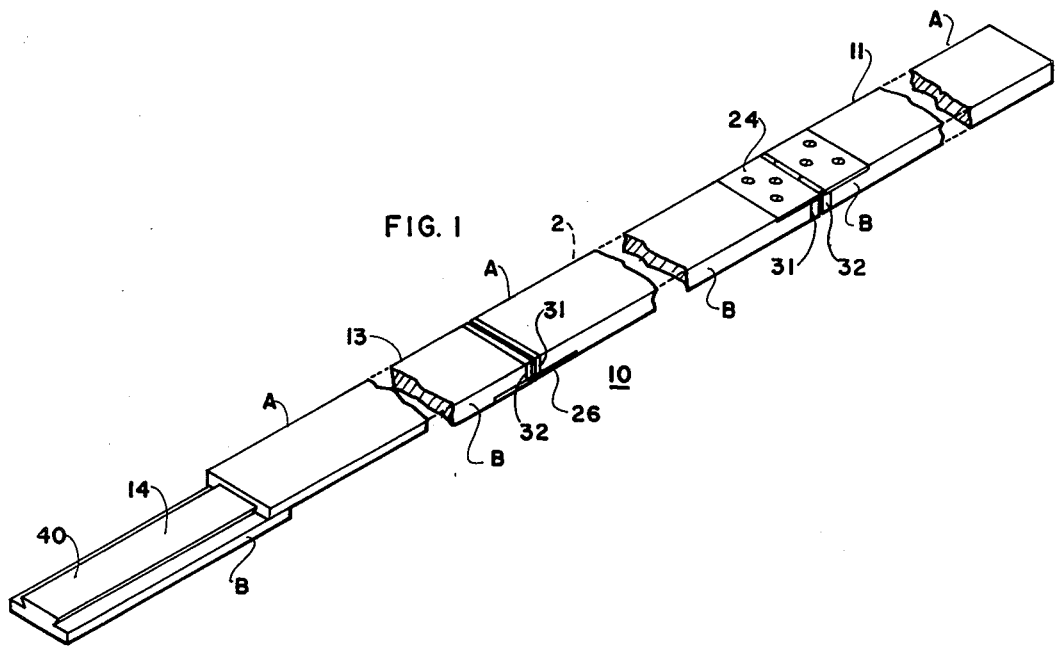
FIG. 1
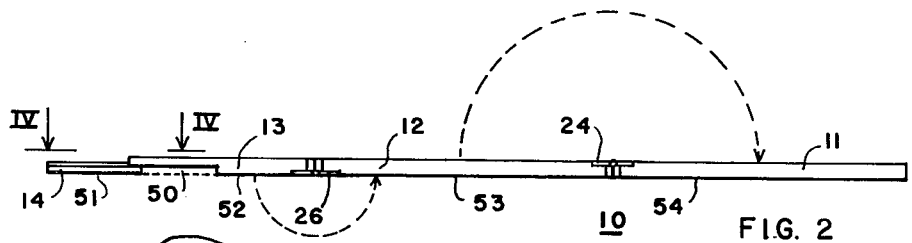
FIG. 2
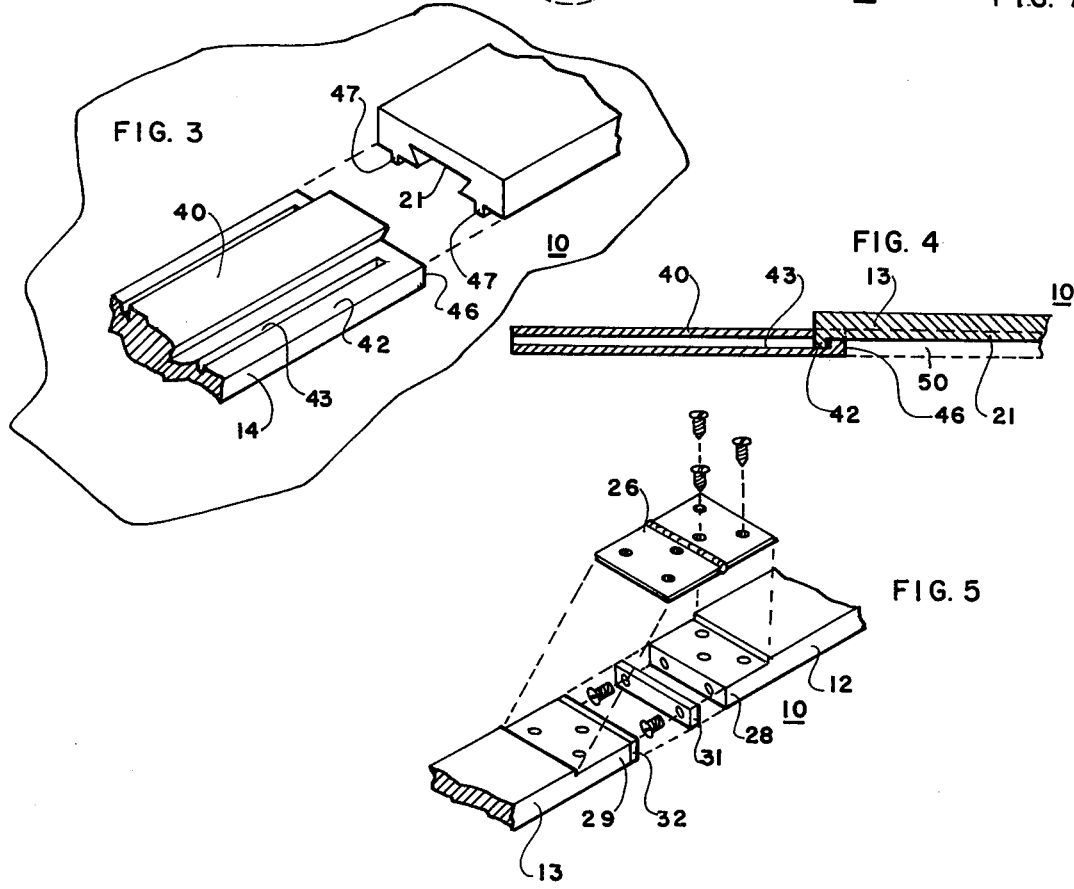
FIG. 3
FIG. 4
FIG. 5

TELESCOPIC STRAIGHT EDGE

SUMMARY OF THE INVENTION

My invention is a straight edge for use in construction formed of a plurality of members joined by hinges to an end member fitted with a slidable section mounted by a dovetail groove and tongue. The butt sections of each member are fitted with a magnet at each hinge joint so as to latch the unfolded members together in the extended position.

BRIEF DESCRIPTION OF THE DRAWINGS

The objects and features of the invention may be understood with reference to the following detailed description of an illustrative embodiment of the invention, taken together with the accompanying drawings in which:

FIG. 1 is a perspective view of the invention;

FIG. 2 is a side view of the invention;

FIG. 3 is an exploded detail perspective view of the invention;

FIG. 4 is a detail sectional view of the invention; and

FIG. 5 is an exploded perspective view of a hinge joint.

DESCRIPTION OF THE PREFERRED EMBODIMENT

Turning now descriptively to the drawings, in which similar reference characters denote similar elements throughout the several views, FIGS. 1-5 illustrate the foldable straight edge 10 which is formed of three members 11, 12, 13, with member 12 hinged at each of its opposed ends to a member 11 or 13, and with a fourth member 14 slidably mounted in a dovetail slot 21 of member 13.

The members 11-14 are joined together so that their side edges A and B lie in common parallel planes with all edges A lying in one common plane and opposed edge B lying in a second common plane.

Hinges 24 and 26 joining members 11, 12 and members 12, 13 respectively are each flush mounted to the respective members with the axis of the hinge pins being perpendicular to the longitudinal axis of the joined members and with hinge 24 mounted on a surface opposed to that of hinge 26 so that all three members may be folded, as shown in FIG. 2 to lie in parallel abutting configuration.

Each butt end section 28 adjacent a hinged joint of a member 12 is fitted with a magnet 31 and the adjoining butt end section 29 is fitted with a magnetic attractable bar 32 with magnet 31 and bar 32 mounted to abut each other in the extended (unfolded) position of the members 12, 13 so as to latch the joined members in the unfolded position.

Member 14 is formed with a projecting rib extending from one surface 42 along its length of the shape of a dovetail tongue 40 in section, that slidingly engages a similarly shaped dovetail recess 21 formed along the length of the member 13.

As shown in FIG. 3, a continuous grooved recess 43 extends from the surface 42 of member 14 on each side of tongue 40 along the length of member 14 to terminate short of the interior end edge 46 of member 14, with each grooved recess 43 slidably engaged by a detent 47 fixed to member 13 to prevent removal of member 14 from member 13 when member 14 is fully slidably extended from member 13.

As shown in FIGS. 1, 2 and 4, member 13 is formed with a recess 50 in the end portion of member 13 to accomodate member 14 in the retracted position of members 13 and 14 so that the bottom surface 51 of member 14, lying between edges A and B of member 14 lies in the same plane as the bottom surface 52 of the remaining portion of member 13, in both the retracted and the extended position of member 14 with regard to member 13; with hinges 24 and 26 located so that in the fully extended position of members 11, 12 and 13, the bottom surfaces 54, 53 and 52 respectively all lie along a common plane.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A foldable straight edge comprising
   a plurality of hinged members pivotally joined together so as to be foldable about hinges from an extended position to a folded position,
   said hinges flush mounted in the attached members, with
   said hinged members each of a size and shape such that when assembled together, a first straight edge of each hinged member lies in a common plane in both the folded and the extended position and in all intermediate positions between said folded and said extended positions, with
   the butt end of each hinged member adjacent a hinged joint, fitted with magnetic means to detachably latch to the adjacent butt end of the hinged member joined to the said hinged joint in the extended position of the two said hinged members, so as to latch the hinged members in said extended position, in which
   the magnetic means comprises a magnet that is fixed to the butt hinged end of one hinged member and a magnetically attractable bar that is fixed to the butt hinged end of the other hinged member joined to a common hinge, in which
   said hinged members are each of a size and shape that a bottom surface of each member that is at a substantial angle to the first edge of each said member lies along a common plane in the extended position of the hinged members, with each said bottom surface lying in parallel planes in the folded position of said hinged members, in which
   a slidable member is joined to an end hinged member by a tongue and groove joint formed in the said members, with an end portion of said end hinged member formed with a recess so that the slidable member fits into said recess in the retracted position and with said end hinged member and said slidable member shaped so that a bottom surface of said slidable member lies along a common plane with a bottom surface of the portion of the end hinged member adjoining said end portion in both the retracted and the extended positions of said slidable member, in which
   a first edge of the end hinged member slidably joined to the slidable member and a first edge of the slidable member lie in a common plane in all relative assembled positions of said members.

* * * * *